(12) United States Patent
Agarwal

(10) Patent No.: US 10,831,846 B2
(45) Date of Patent: *Nov. 10, 2020

(54) ADJUSTING SEARCH RESULTS BASED ON OVERLAPPING WORK HISTORIES

(71) Applicant: Microsoft Technology Licensing, LLC, Redmond, WA (US)

(72) Inventor: Rahul Agarwal, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 298 days.

This patent is subject to a terminal disclaimer.

(21) Appl. No.: 16/056,202

(22) Filed: Aug. 6, 2018

(65) Prior Publication Data

US 2018/0373798 A1 Dec. 27, 2018

Related U.S. Application Data

(63) Continuation of application No. 14/447,431, filed on Jul. 30, 2014, now Pat. No. 10,042,937.

(51) Int. Cl.
*G06F 16/9535* (2019.01)
*G06F 16/2457* (2019.01)

(52) U.S. Cl.
CPC .... *G06F 16/9535* (2019.01); *G06F 16/24578* (2019.01)

(58) Field of Classification Search
None
See application file for complete search history.

(56) References Cited

U.S. PATENT DOCUMENTS

| 2014/0156652 | A1* | 6/2014 | Abiola | G06Q 10/1053 707/723 |
| 2015/0006422 | A1* | 1/2015 | Carter | G06Q 10/1053 705/321 |
| 2015/0127565 | A1* | 5/2015 | Chevalier | G06Q 30/00 705/319 |

* cited by examiner

*Primary Examiner* — Mariela Reyes
*Assistant Examiner* — Courtney Harmon
(74) *Attorney, Agent, or Firm* — Schwegman Lundberg & Woessner, P.A.

(57) ABSTRACT

Techniques for ranking search results generated by a search engine are described. A search query initiated by a searcher is processed to identify a set of member profiles satisfying the search query. A ranking score is assigned to each member profile of the set of member profiles. A subset of the set of member profiles is identified based on a determination of an overlap between a work history specified in each of the subset of member profiles and a work history specified in a profile of the searcher. The ranking score assigned to a member profile of the subset of the set of member profiles is adjusted based on the determination. A portion of each of the set of member profiles satisfying the search query is communicated for presentation as search results in a search results interface.

20 Claims, 10 Drawing Sheets

US 10,831,846 B2

ADJUSTING SEARCH RESULTS BASED ON OVERLAPPING WORK HISTORIES

CROSS-REFERENCE TO RELATED APPLICATION

This application is a continuation of U.S. patent application Ser. No. 14/447,431, filed on Jul. 30, 2014, which is incorporated herein by reference in its entirety.

TECHNICAL FIELD

The present disclosure generally relates to data processing systems and information search engines. In one specific embodiment, the present disclosure relates to methods, systems and computer program products for supplementing search results generated by a search engine based on an identification of an overlap in work histories specified in a member profile of the searcher and work histories specified in member profiles of members of a social networking system satisfying a search query submitted by the searcher (or member profiles of additional members connected to the member profiles of the members satisfying the search query).

BACKGROUND

Online social network services provide users with a mechanism for defining, and memorializing in a digital format, their relationships with other people and other entities (e.g., companies, schools, etc.). This digital representation of real-world relationships and associations is frequently referred to as a social graph. There are a variety of web-based applications and services that implement and maintain their own social graph, and still more applications and/or services that leverage the social graph of a third-party social network service (e.g., via publically available application programming interfaces, or APIs). The number and variety of applications and services that leverage a social graph maintained by a social network service is seemingly endless. For instance, a variety of messaging and content sharing applications leverage a social graph to establish user privileges for sharing content with, or accessing the content of, others.

In addition to maintaining a social graph, many social network services maintain a variety of personal information about their members. For instance, with many social network services, when a user registers to become a member and/or at various times subsequent to registering, the member is prompted to provide a variety of personal or biographical information, which may be displayed in a member's personal web page. Such information is commonly referred to as personal profile information, or simply "profile information," and when shown collectively, it is commonly referred to as a member's profile. For instance, with some of the many social network services in use today, the personal information that is commonly requested and displayed as part of a member's profile includes a person's age, birthdate, gender, interests, contact information, residential address, home town and/or state, the name of the person's spouse and/or family members, and so forth. With certain social network services, such as some business or professional network services, a member's personal information may include information commonly included in a professional resume or curriculum vitae, such as information about a person's education, the schools, colleges or universities that the member attended, the company at which a person is employed, an industry in which a person is employed, a job title or function, an employment history, skills possessed by a person, professional organizations of which a person is a member, and so on.

Because social network services are a rich source of information about people and their relationships with other people, social network services are an extremely useful tool for performing certain tasks. For example, just as a telephone directory, phone book, or white pages previously served as the go-to source for basic information about people, contemporary social network services serve as a far richer directory of people. Many people use social network services to search for member profiles of friends, colleagues, classmates, and other people they may know, or want to know. Accordingly, many social network services provide a search engine to facilitate searching for the member profiles of members of the social network service. However, because social network services have so many members, finding the most relevant member profiles corresponding to search query is often difficult.

BRIEF DESCRIPTION OF THE DRAWINGS

Some embodiments are illustrated by way of example and not limitation in the FIGS. of the accompanying drawings, in which.

DETAILED DESCRIPTION

Figure 1:
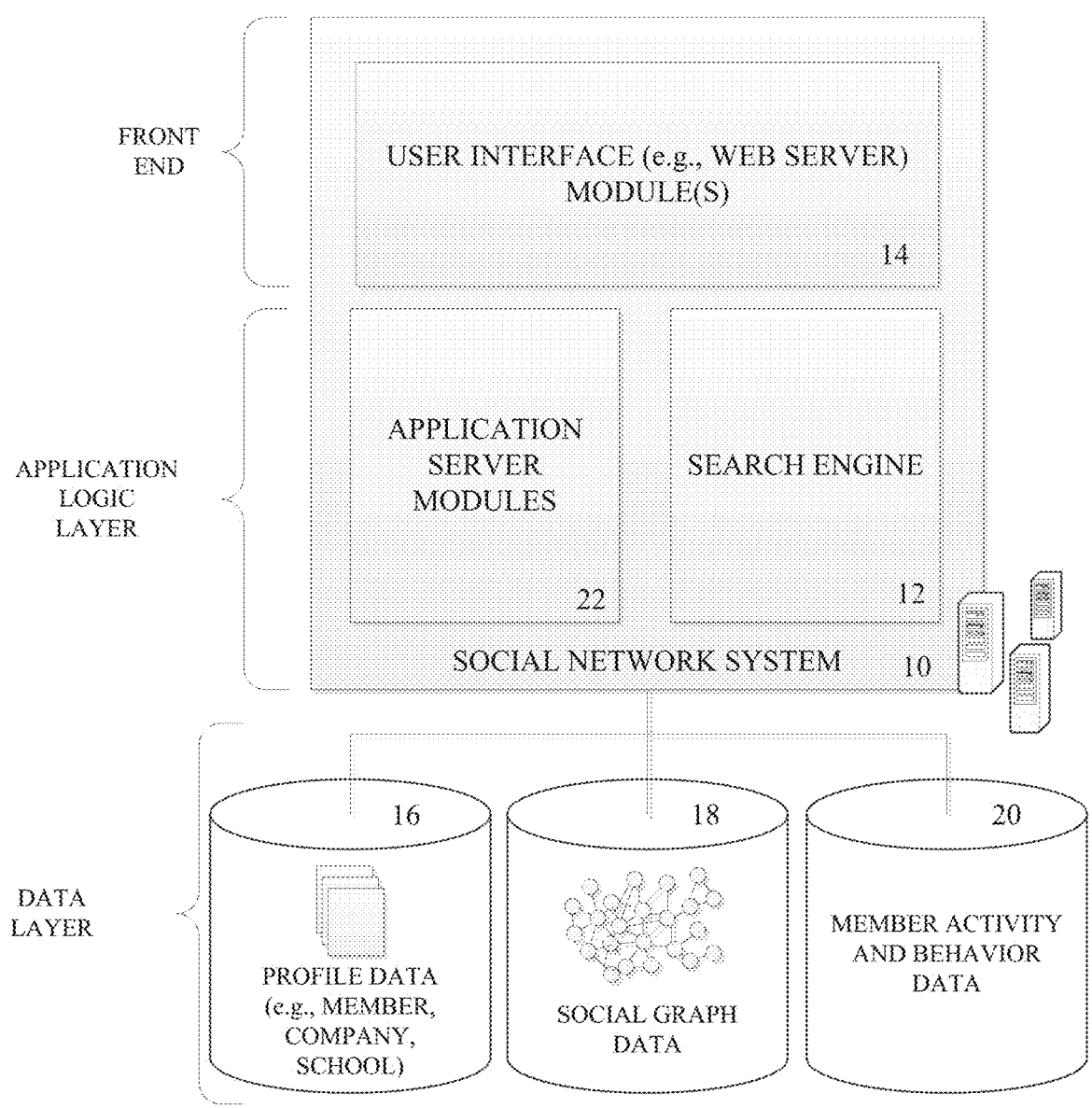
FIG. 1 is a block diagram of the functional modules or components that comprise a computer-network based social network service, including a search engine consistent with some embodiments of the invention.

The present disclosure describes methods, systems and computer program products for processing a search query submitted by a searcher to identify member profiles of members of a social network service for presentation in a search results page or other user interface. The member profiles, which represent the search results, are presented positioned (e.g., ordered) based on a ranking score that is assigned to each search result based on a criterion (e.g., one or more similarities between information specified in a profile of the searcher and information specified in the member profiles). In various embodiments, the ranking score may be adjusted at least in part based on identifying an overlap between a work history specified in a profile of the searcher and a work history specified in at least one of the member profiles. In various embodiments, the search results may be supplemented with additional member profiles corresponding to members having a work history that overlaps with a colleague of the searcher or a colleague of the searcher who is also connected to the searcher. In various embodiments, the strength of the connections may also be considered in the ranking score or the adjustment of the ranking score. For example, a first-degree connection of the searcher may be calculated to carry more weight than a second-degree connection of the searcher.

In various embodiments, a searcher is a person who is executing the search query and a viewee is a person who is viewed on a search result page. In various embodiments, work overlap exists between a first member and a second member when it is determined that the first member (e.g., a colleague of a searcher) and the second member (e.g. a first-degree connection of a viewee) worked at the same during a same time period (e.g., based on an analysis of work histories specified in the member profiles of the first member and the second member).

Techniques for ranking search results generated by a search engine are described. A search query initiated by a searcher is processed to identify a set of member profiles satisfying the search query. A ranking score is assigned to each member profile of the set of member profiles. A subset of the set of member profiles is identified based on a determination of an overlap between a work history specified in each of the subset of member profiles and a work history specified in a profile of the searcher. The ranking score assigned to a member profile of the subset of the set of member profiles is adjusted based on the determination. A portion of each of the set of member profiles satisfying the search query is communicated for presentation as search results in a search results interface, the search results positioned to reflect the ranking score assigned to each of the member profiles of the set of member profiles, including the adjusted ranking score assigned to the member profile of the subset.

In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

FIG. 1 is a block diagram of the functional modules or components that comprise a computer- or network-based social network service 10, including a search engine 12 consistent with some embodiments of the invention. As shown in FIG. 1, the social network system 10 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social network system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end consists of a user interface module (e.g., a web server) 14, which receives requests from various client-computing devices, and communicates appropriate responses to the requesting client devices. For example, the user interface module(s) 14 may receive requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 1, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the social network service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's member profile, for example, in the database with reference number 16. With some embodiments, a member's profile data will include not only the explicitly provided data, but also any number of derived or computed member profile attributes and/or characteristics.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 1, consistent with some embodiments, the system may include additional databases for storing information relating to a wide variety of entities, such as information concerning various online or offline groups, job listings or postings, photographs, audio or video files, and so forth.

With some embodiments, the social network service may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules 22, which, in conjunction with the user interface module(s) 14, generates various user interfaces (e.g., web pages) with data retrieved from various data sources in the data layer. With some embodiments, individual application server modules 22 are used to implement the functionality associated with various applications, services and features of the social network service. For instance, a messaging application, such as an email application, an instant messaging application, or some hybrid or variation of the two, may be implemented with one or more application server modules 22. Of course, other applications or services may be separately embodied in their own application server modules 22.

The social network service may provide a broad range of applications and services that allow members the opportunity to share and receive information, often customized to the interests of the member. For example, with some embodiments, the social network service may include a photo sharing application that allows members to upload and share photos with other members. As such, at least with some embodiments, a photograph may be a property or entity included within a social graph. With some embodiments, members of a social network service may be able to self-organize into groups, or interest groups, organized around a subject matter or topic of interest. Accordingly, the data for a group may be stored in a database (not shown). When a member joins a group, his or her membership in the group will be reflected in the social graph data stored in the database with reference number 18. With some embodiments, members may subscribe to or join groups affiliated with one or more companies. For instance, with some embodiments, members of the social network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data of the database with reference number 18.

In addition to the various application server modules 22, the application logic layer includes a search engine 12. As illustrated in FIG. 1, with some embodiments the search engine 12 is implemented as a service that operates in conjunction with various application server modules 22. For instance, any number of individual application server modules 22 can invoke the functionality of the search engine 12. However, with various alternative embodiments, the search engine 12 may be implemented as its own application server module such that it operates as a stand-alone application. With some embodiments, the search engine 12 may include or have an associated publicly available application programming interface (API) that enables third-party applications to invoke the functionality of the search engine 12. With some embodiments, the search engine 12 may be a people-search engine, and provide functionality to search for people (e.g., member profiles) specifically. Alternatively, the search engine module 12 may facilitate searching for any type of information entity (e.g., people or member profiles, companies, schools and other educational institutions, etc.) that is maintained and used by the various applications of the social network system, such as companies, groups, job listings, etc. With such an embodiment, the user performing the search may specify the type of entity to be searched for. Alternatively, the search engine may algorithmically identify the type of search being performed, for example, based on the search query.

As described in greater detail below, in general, the search engine 12 uses a ranking algorithm that leverages, for example, similarities between information specified in a profile of a searcher and information specified in member profiles satisfying a search query submitted by the searcher. For example, in various embodiments, the ranking algorithm boosts or increases the ranking scores assigned to certain of the member profiles satisfying the search query when those member profiles share one or more particular attributes or characteristics in common with the member profile of the member performing the search. For example, with some embodiments, the ranking algorithm will increase the ranking score assigned to those member profiles satisfying the search query and having a profile attribute indicating the member is employed at the same company as the member performing the search (e.g., that they are current colleagues). Accordingly, if the member profile of the member performing the search indicates that the member is currently employed at ACME Products, any member profile that satisfies the search query and also indicates that the member is employed at the same company—that is, ACME Products—will have its ranking score adjusted upward or otherwise calculated or derived to reflect this shared member profile attribute. Accordingly, with all else equal, if two member profiles for two different persons with the same name, (e.g., John Doe) differ in that one of the members is employed at the same company as the member performing the search, and the other member is employed at some other company, the member profile of the member employed at the same company as the searching member will be assigned the higher ranking score, and thus be presented more prominently in a list of search results. Similarly, ranking scores for a member may receive a boost based on the member attending the same school, volunteering at a same organization, or otherwise intersecting in some way with the member profile of the member performing the search.

Figure 2:
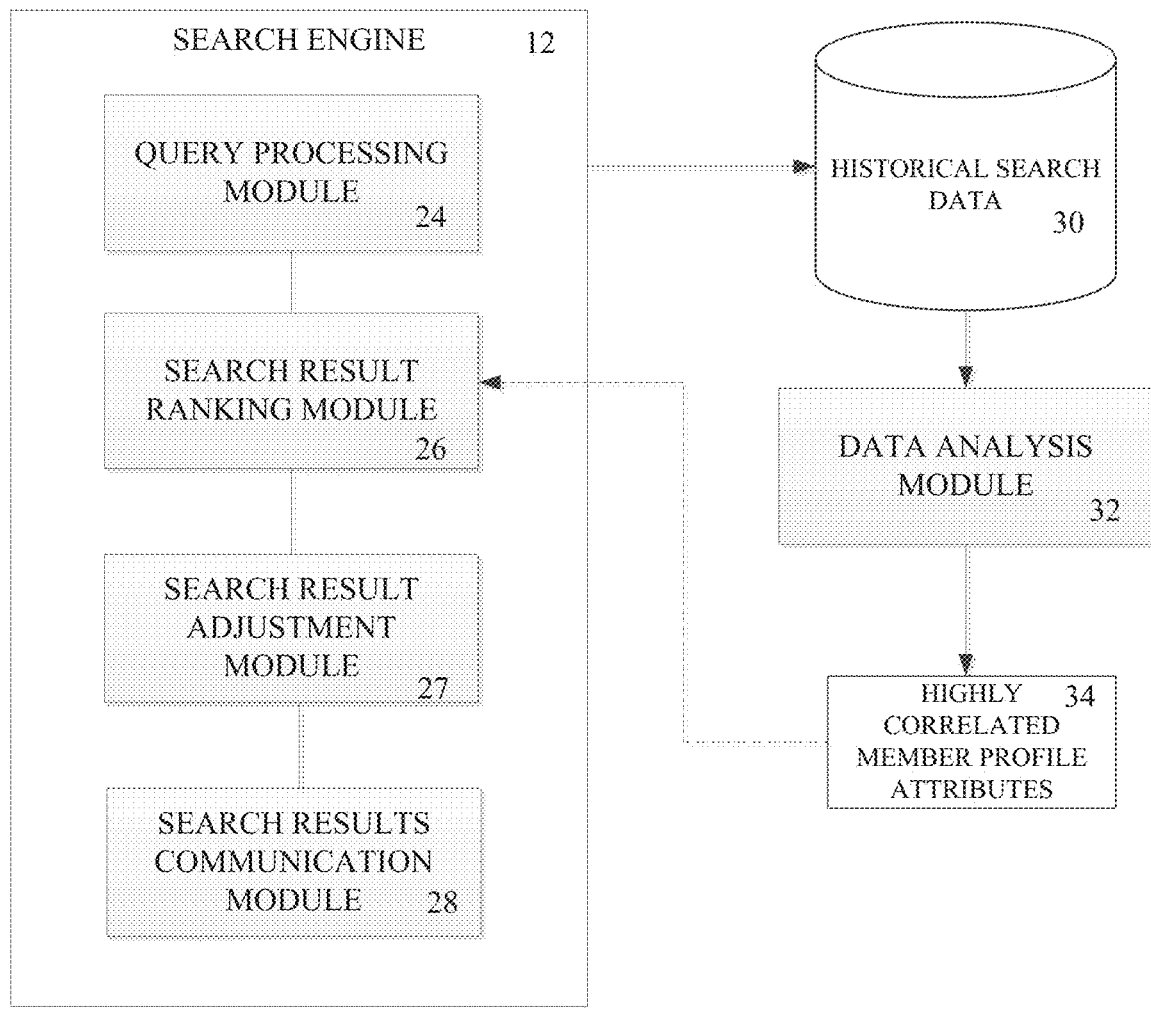
FIG. 2 is a functional block diagram of a search engine, consistent with some embodiments of the invention.

FIG. 2 is a functional block diagram of a search engine, consistent with embodiments of the invention. As illustrated in FIG. 2, the search engine 12 includes a query processing module 24, a search results ranking module 26, a search result adjustment module 27, and a search results presentation module 28. In general, the query processing module 24 receives a search query and then processes the search query by selecting or otherwise identifying data in a database (e.g., a searchable index) that satisfies the search query. Depending upon the nature of the search query, one of several matching rules may be evaluated to identify the member profiles that match the query. For example, if the search query is a first and last name, the search query is processed by selecting the relevant records from a database having names in the appropriate database field that match, exactly or partially, the name specified in the search query. If the search query specifies some other member profile attribute, in addition to or instead of a first and/or last name, a particular matching rule for that member profile attribute may be evaluated to identify member profiles that satisfy the query. For instance, the search query may be a first and/or last name. Alternatively, in some instances, the search query may specify one or more other member profile attributes, to the exclusion, or in addition to, a name. For instance, a search query may include any combination of the following member profile attributes: name (first and/or last); geographical information, including country, state, city, postal code, including proximity to any of the aforementioned; job title; company of current or previous employment; school attended; industry of employment; groups of which one is a member; languages spoken; job function; company size; skills possessed; relationship to person initiating the search (e.g., first degree connection, second degree, and so forth); interests; experience or seniority level; recommendations (e.g., a name of a member who is associated with the member profile as a recommendation), endorsements (e.g., a name of a member who is associated with the member profile as an endorser of a skill or ability), and so on as well as many others.

In various embodiments, the search query may specify a work overlap parameter. The work overlap parameter may specify, for example, that search results are to include or be limited to member profiles corresponding members of the social networking system who worked at a company during a time period at which the searcher also worked at the company. Or the work overlap parameter may specify that search results are to include or be limited to member profiles corresponding to current or past colleagues of the searcher who are also first-degree connections of the searcher. Or the work overlap parameter may specify that search results are to include or be limited to member profiles corresponding first-degree connections of current or past colleagues of the searcher who worked at a company at the same time as the colleague of the searcher worked at the company. Thus, the searcher may use the work overlap parameter to search for members that have a work overlap with the searcher or a work overlap with a connection of the searcher (e.g., a first-degree connection of the searcher who is also a current colleague of the searcher). The query processing module 24, using the received search query, identifies a set of member profiles satisfying the search query.

The search results ranking module 26 derives for each search result (e.g., member profile) a ranking score representing a measure of relevance, particularly, in view of both the search query and the particular member who has invoked or initiated the search. With some embodiments, the ranking algorithm may utilize any number of input signals for use in deriving a ranking score, where one or more signals are combined in some way (e.g., multiplied or added together) to derive an overall ranking score. Consistent with embodiments of the invention, at least one of those input signals or component scores represents the extent to which certain member profile attributes are shared in common between a member profile in the search results and the member profile of the member who has initiated or invoked the search. Accordingly, when the query processing module identifies or selects the database records representing the member profiles that satisfy the search query, certain member profile attributes may also be retrieved for the purpose of comparing those member profile attributes with the corresponding member profile attributes of the member who has initiated or invoked the search. Depending upon the particular member profile attributes in consideration, a particular matching rule may be evaluated to determine the extent to which two members have similarity with respect to the particular member profile attribute.

With some embodiments, the ranking module 26 may have multiple ranking algorithms for use in generating ranking scores. Accordingly, a particular ranking algorithm may be selected and used depending upon the type of search query that has been received, or the specific member profile attributes that have been specified as part of the search query. For instance, if the search query is determined to be a simple name search (e.g., first and/or last name), a particular ranking algorithm for use with that type of search query might be selected and used to derive and assign ranking scores to the search results. However, if the search query specifies a particular member profile attribute, then a different ranking algorithm may be selected and used in deriving and assigning ranking scores. In general, a ranking algorithm used by the ranking module may include any number of weighting factors, which may vary depending upon the search query type, and the specific member profile attribute types that have been specified as part of the search query. The following example is illustrative.

Presume for sake of an example that a member of the social network service residing in Detroit, Mich. desires to reach out and make contact with a former college classmate known to now reside in Seattle, Wash. The searching member generates a search query specifying both the first and last name of the college classmate and specifies as a search parameter the location, "Seattle, Wash." Because the search query specifically indicates a geographical location that is different from the searcher's geographical location, the ranking algorithm selected for use in deriving ranking scores for the search results should not promote or otherwise boost the relevance scores assigned to member profiles as a result of those member profiles indicating that a member lives in the same location (i.e., Detroit, Mich.) as the member performing the search. Furthermore, presume for a moment that the member residing in Detroit attended college in Seattle, Wash. Because the query has specified the geographical location, Seattle, Wash., and because the searching member attended college in Seattle, Wash., those member profiles matching the query and specifying attendance or graduation from the same college as the searching member may be boosted in the search results ranking. For instance, the ranking module may weight more heavily any member profile in which the member has indicated attendance at, or graduation from, the same university as the searching member. In essence, by specifying a particular member profile attribute (in this example, a geographical location), another member profile attribute (e.g., college/university attended) is weighted more heavily in the ranking algorithm to reflect the presumed importance of a member profile that has as an attribute a college or university that is the same as the member performing the search.

In various embodiments, the search result adjustment module 27 may adjust the search results based on detected work overlaps between one or more of the searcher, member profiles in the search results satisfying the search query of the searcher, member profiles in the search results corresponding to members of the social networking system who are connected to the searcher, or member profiles having a connection to one or more member profiles in the search results. For example, based on a determination that a member profile in the search results corresponds to a first-degree connection of a past or present colleague of the searcher (e.g., a member who is currently working at the same company as the searcher) and a determination that the first-degree connection of the colleague of the searcher has a work overlap with the colleague of the searcher, the search result adjustment module 27 may boost or increase the rating score associated with that member profile. In various embodiments, the amount of the boost may be based on various factors, such as a degree of relatedness of the member to the searcher (e.g., whether the identified member is a first-degree connection of the searcher, a first-degree connection of a colleague of the searcher, a first-degree connection of the searcher and the colleague, or neither a connection of the searcher nor the colleague). Thus, in various embodiments, member profiles corresponding to members having stronger connections to the searcher (or connections of the searcher) may receive a greater boost than member profiles corresponding to members having less strong connections.

Once the search result ranking module 26 has generated and assigned to each search result a ranking score, and once the search result adjustment module 27 has made any adjustments to the search results, the search results presentation module 28 causes the search results to be presented, arranged in order of their assigned ranking score, in a user interface. For instance, the user interface may be a search results page providing a simple list of at least a portion of the member profiles that satisfied the query. Alternatively, in some instances, the user interface may operate in conjunction with the query processing module 24, the search results ranking module 26, and the search result adjustment module 27 to implement an incremental search technique whereby search results are presented while a member is typing in the search query. Such results may be presented, for example, in a drop down suggestion list, or directly in a portion of a search results web page.

As illustrated in FIG. 2, with some embodiments, for each search query that is processed by the search engine, the search engine 12 will store resulting data—in particular, the search results that resulted from a particular search query, and any user-selections—in a database 30. Once a sufficiently large data set for a particular period of time has been established, a data analysis module 32 is then used to identify the specific member profile attributes that are most highly correlated amongst the member profiles that are ultimately selected from a search results set, and the member profile of the member who has invoked a particular search. In this manner, the most highly correlated member profile attributes 34 are identified, and can be used in a ranking algorithm by the search results ranking module 26. With some embodiments, the ranking algorithm may be implemented to weight the various member profile attributes used in the ranking algorithm based on the level of correlation as determined by the data analysis module 32. For example, if the data shows that a searching member selects a member profile from the search results having a first member profile attribute (e.g., geographic location of residence) in common with his or her own member profile a particular percentage (e.g., seventy-five percent) of the time, and a second member profile attribute (e.g., the company at which the member is employed) in common with the searching member's profile some percentage of time lower than seventy-five percent, this information may be used to weight the significance of the two member profile attributes contribution to the overall ranking score. In any case, the data analysis module 32 is used to analyze historical search data 30 for the purpose of identifying the member profile attributes that are the best input signals for the ranking algorithm.

Figure 3:
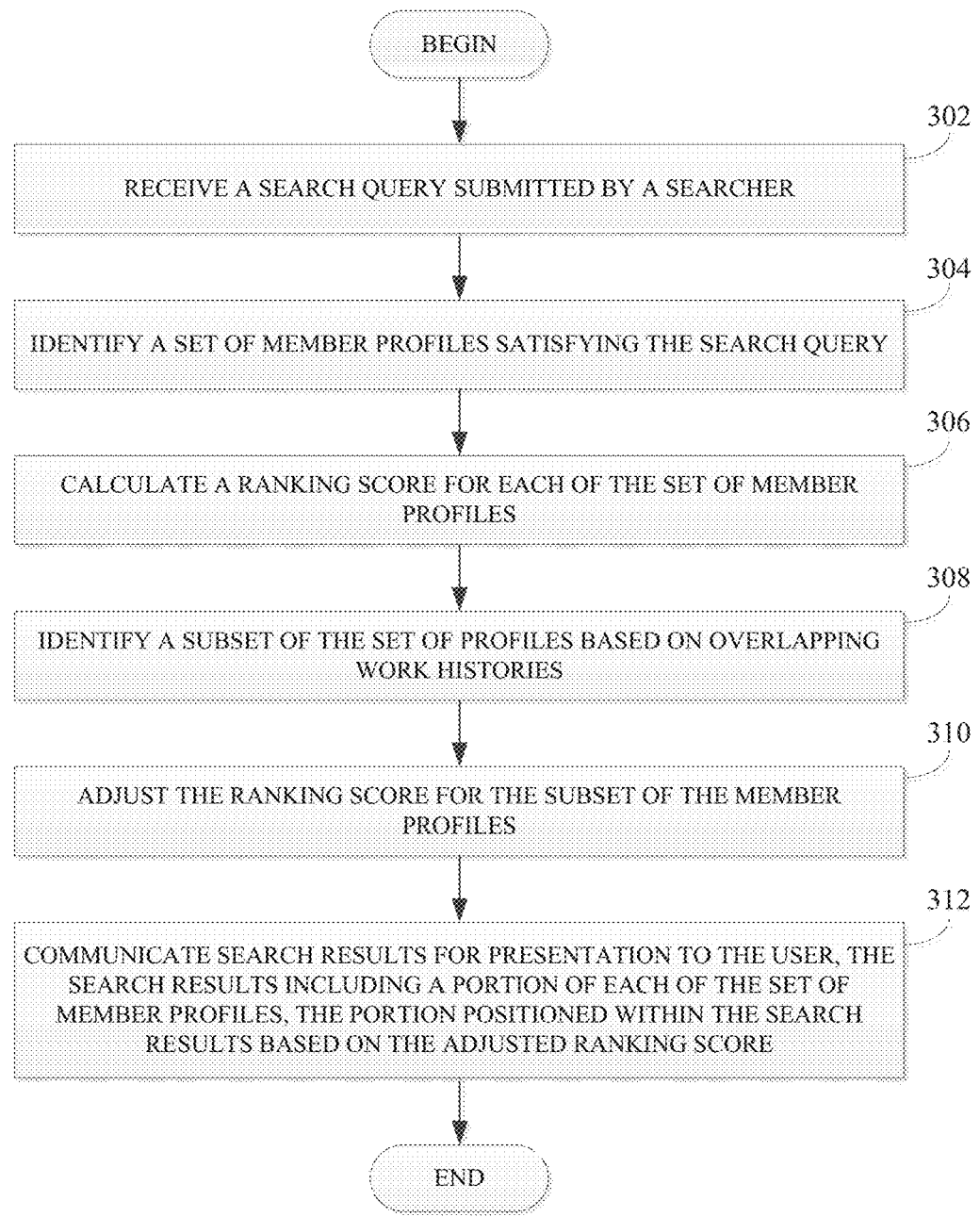
FIG. 3 is a flow diagram illustrating a method of processing a search query.

FIG. 3 is a flow diagram illustrating a method 300 of processing a search query, consistent with some embodiments of the invention. In various embodiments, the method 300 may be implemented by one or more of the modules of the search engine 12 of FIG. 2. At operation 302, the search engine receives a search query from a searcher (e.g., a member of the social network service submitting the search).

At operation 304, the search query is processed to identify the member profiles satisfying the search query. In various embodiments, the search results may be supplemented with or limited to additional member profiles based on overlapping work histories (e.g., based on a work history parameter specified by the searcher in the search query). For example, additional member profiles may be added to the search results based on a determination that the additional member profiles correspond to first-degree connections of one or more of the member profiles in the search results and have an overlapping work history with the member profiles in the search results. Or the search results may be filtered to include only member profiles having a work overlap with a member profile of the searcher or a work overlap with one or more member profiles included in the search results, such member profiles corresponding to current or past colleagues of the searcher. In various embodiments, a further subset of the results may be identified based on other factors, such as a degree of connectedness of each member profile in the subset to the searcher or a member profile included in the search results. Thus, for example, the search results may be supplemented with or limited to a set of member profiles corresponding to members of the social-networking system who are first-degree connections of current colleagues of the searcher having member profiles that satisfy the search query submitted by the searcher and who also have a work overlap with one or more of the current colleagues of the searcher.

At method operation 306, the search engine assigns to each member profile that satisfies the search query a ranking score. The ranking score may be derived based on a variety of input signals, including at least one signal or component score representing a measure of the similarity of certain member profile attributes. Specifically, the ranking score may be increased for a particular member profile when one or more member profile attributes of the particular member profile have the same, or a similar, value as the corresponding member profile attribute for the member profile of the member who has invoked or initiated the search request.

The particular member profile attribute or attributes that are compared may vary considerably from one embodiment to the next, but may include any one or more of: geographical information, including country, state, city, postal code, including proximity to any of the aforementioned; job title; company of current or previous employment; school attended; industry of employment; groups of which one is a member; languages spoken; job function; company size; skills possessed; relationship to person initiating the search (e.g., first degree connection, second degree, and so forth); interests; and/or, experience or seniority level. With some embodiments, the comparison of member profile attributes involves matching algorithms beyond identifying exact matches. For example, depending on the particular member profile attribute being evaluated or compared, a different matching algorithm or matching requirement may be specified, such that the term "match," as used herein, includes both exact matches as well as partial matches. With some member profile attributes, such as the geographical location of a member, the matching algorithm or requirement may specify a range, such that a match exists when the distance between two geographical locations is within a particular threshold, or more generally, when some value is within a certain range.

At operation 308, a subset of the member profiles satisfying the search query is identified based on overlapping work histories. For example, a subset of the member profiles corresponding to members of the social networking system having worked at a same company as the searcher during a same time period as the searcher are identified. Or a subset of the member profiles corresponding to members of the social networking system who are first-degree connections of a colleague of the searcher and who also worked at a same company during a same time as the colleague of the searcher are identified.

At operation 310, the ranking scores for the identified subset of member profiles are adjusted based on information pertaining to the overlapping work histories. For example, the information pertaining to the overlapping work histories that affect the amount of the adjustment may include a length of time of the overlap, a degree of relatedness of the overlap (e.g., whether overlap is between a member profile of the searcher and a connection (e.g., a colleague of the searcher), between a member profile of a member unconnected to the searcher but connected to a member profile in the search results (e.g., as a first-degree connection of the member in the search results), or another overlap, a recentness of the overlap (e.g., how recent the overlap was in the relative work histories specified in the member profiles in which the overlap was detected), and so on. Thus, the ranking score may be adjusted based on a relevancy to the searcher of the detected work overlaps.

Finally, after a ranking score has been assigned to each search result (e.g., member profile satisfying the search query) and adjusted as necessary based on detected work overlaps, the search results are communicated at operation 312 for presentation and arrangement in order of their respective ranking scores. With some embodiments, the search results may appear in an infinitely scrolling web page. Alternatively, with some embodiments, a portion of the search results having the highest assigned ranking score may be presented on a first page of the search results, with subsequent pages showing additional results. In general, the search results are shown in a list, with the member profile having the highest assigned ranking score appearing at the top of the list. However, in various alternative embodiments, the search results may be presented in an alternative layout. For example, with a mobile or tablet device, the search results may appear in a list that is navigated from side-to-side, as opposed to top-to-bottom.

Figure 4:
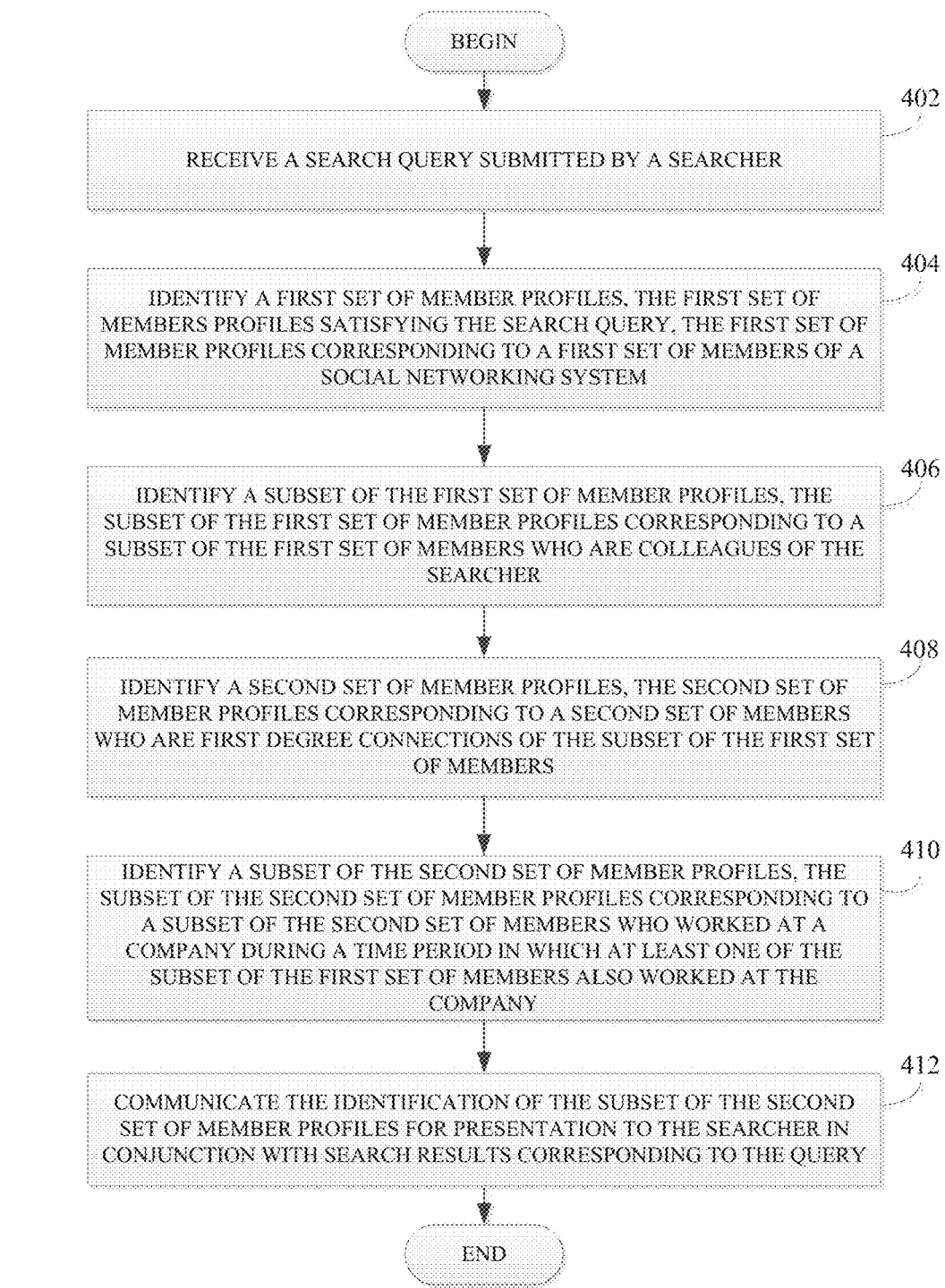
FIG. 4 is a flow diagram illustrating a method of processing a search query.

FIG. 4 is a flow diagram illustrating a method 400 of processing a search query, consistent with some embodiments of the invention. In various embodiments, the method 400 may be implemented by one or more of the modules of the search engine 12 of FIG. 2. At operation 402, the search engine receives a search query from a searcher (e.g., a member of the social network service submitting the search). In various embodiments, the search query may include a member identifier corresponding to a viewee for which a work overlap is to be determined.

At operation 404, the search engine identifies a first set of member profiles based on the first set of member profiles satisfying the search query. Here, the first set of member profiles corresponds to a first set of members of a social networking system. In various embodiments, the first set of member profiles may include only members having a particular strength of a connection to the searcher (e.g., members who are first-degree connections of the searcher).

At operation 406, the search engine identifies a subset of the first set of member profiles based on the subset of the first set of member profiles corresponding to a subset of the first set of members who are current colleagues of the searcher (e.g., who currently work at the same company as the searcher).

At operation 408, the search engine identifies a second set of member profiles based on the second set of member profiles corresponding to a second set of members who have a particular strength of connection to the first set of members (e.g., who are first-degree connections of the first set of members). In other words, in various embodiments, the search engine iterates over the first set of member profiles to identify a second set of member profiles corresponding to first-degree connections of the first set of members.

At operation 410, the search engine identifies a subset of the second set of member profiles based on the subset of the second set of member profiles corresponding to a subset of the second set of members who worked at worked at a company during a time period in which at least one of the subset of the first set of members also worked at the company. In other words, the search engine identifies the subset of the second set of member profiles based on overlaps in the work histories between the second set of members and the subset of the first set of members.

At operation 412, the search engine communicates the identification of the subset of the second set of member profiles for presentation to the searcher as the search results (or in conjunction with the search results) corresponding to the query. In various embodiments, the identification of the subset of the second set of member profiles may be represented visually (e.g., with an icon being displayed next to each search result corresponding to one of the subset of the second set of member profiles). In various embodiments, a ranking of the subset of the second set of member profiles may be adjusted, as described above with respect to FIG. 3, before the search results are presented to the searcher.

Figure 5:
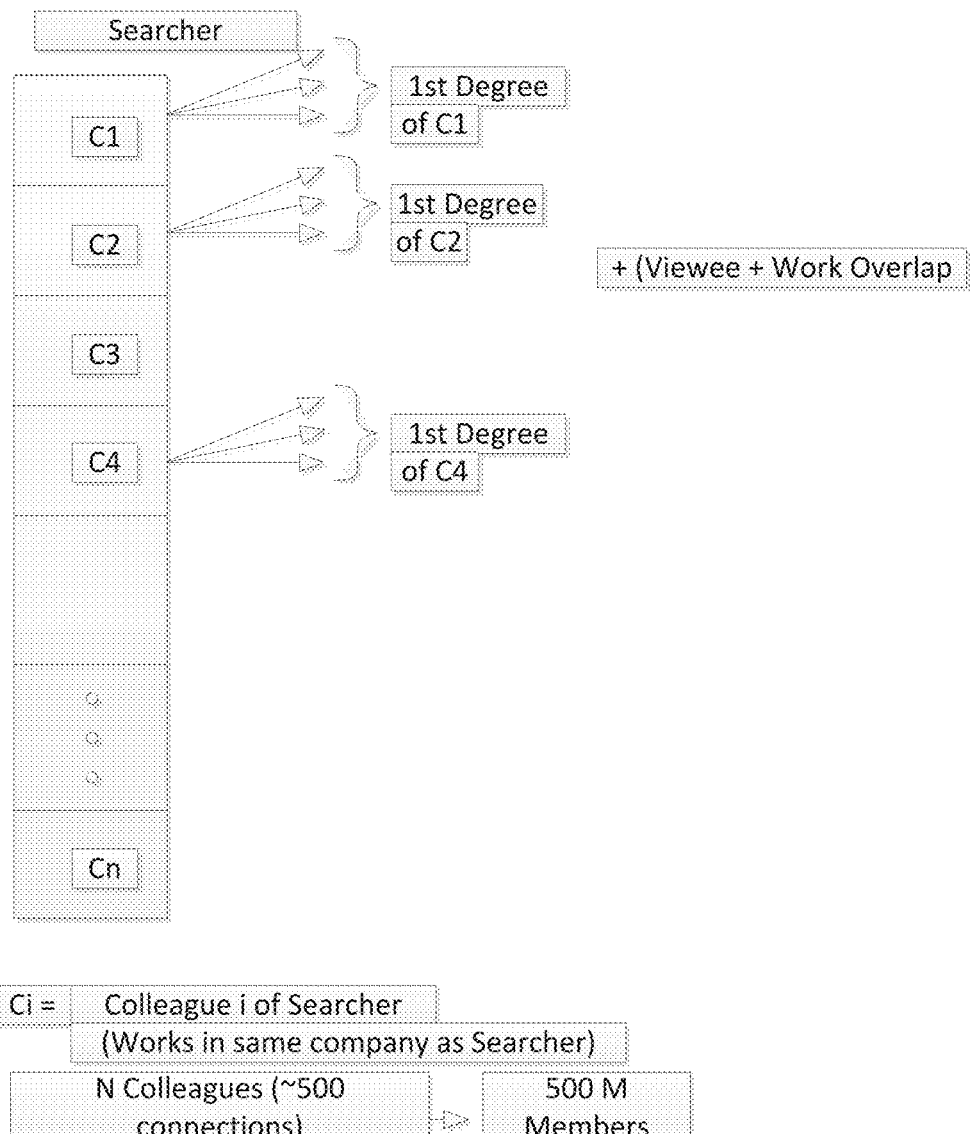
FIG. 5 is a diagram depicting a top-down method of identifying member profiles based on overlapping work histories.

FIG. 5 is a diagram depicting a top-down method 500 of identifying member profiles based on overlapping work histories. In various embodiments, the method 500 is implemented by one or more modules of the search engine 12. For example, FIG. 5 illustrates the process of analyzing first degree connections of all co-workers currently employed at a searcher's current employer to determine who among them are also first degree connections of a viewee and have work overlap with the viewee. In this example, the search engine analyzes the member profiles of colleagues of the searcher to identify member profiles corresponding to first-degree connections of each of the colleagues. Thus, for N colleagues, a large number of (e.g., 500) member profiles are identified. The search engine also determines whether any of the identified member profiles is a viewee (e.g., whether any of the identified member profiles appears in the search results of the viewer (e.g., the searcher)). The search engine also determines whether any of the viewees have work histories that overlap with the searcher (or are connected to member profiles corresponding to first-degree connections of the viewees). Thus, FIG. 5 demonstrates how, in various scenarios, the problem set may explode with a top down approach. For example, in a company with 20,000 people in which each person has 300 connections on average, approximately 10 million documents (e.g., member profiles) would have to be analyzed. Thus, depending on the size of the company and hardware resources that are available (processors, memory, and so on), the analysis may not be scalable for real-time computation.

Figure 6:
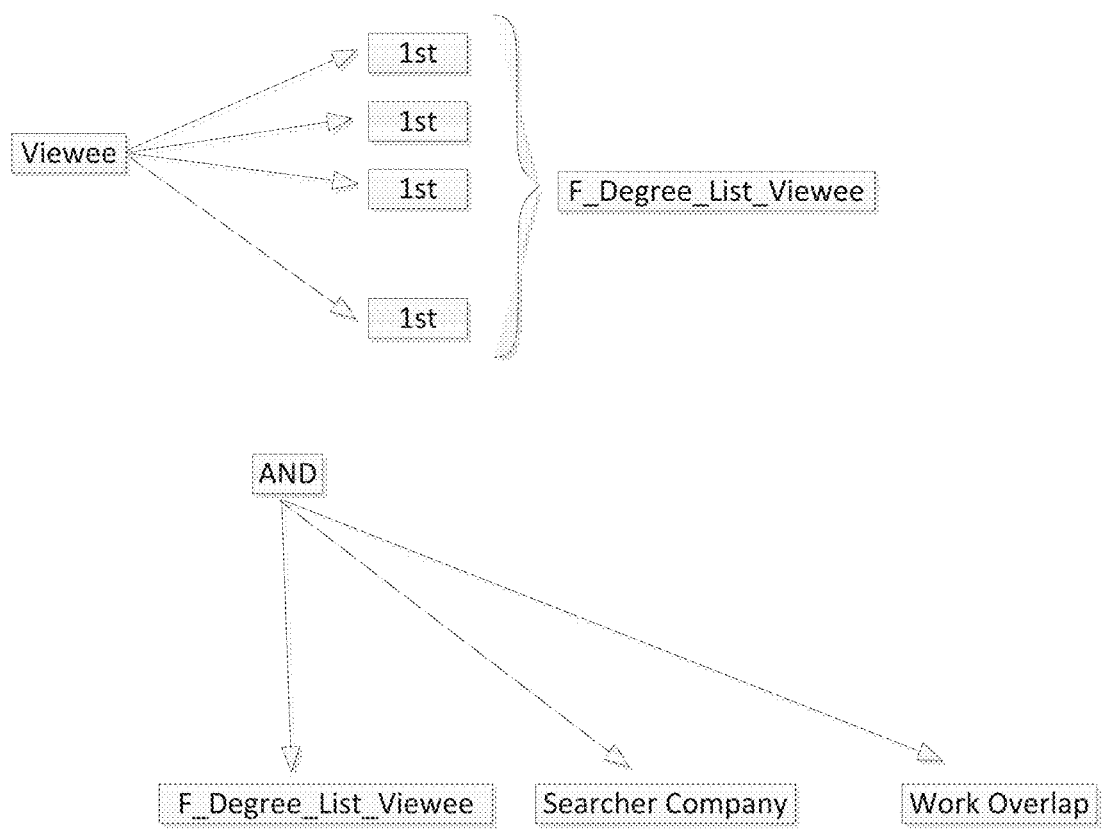
FIG. 6 is a diagram depicting a bottom-up method of identifying member profiles based on work histories.

FIG. 6 is a diagram depicting a bottom-up method 600 of identifying member profiles based on work histories. In various embodiments, the method 600 is implemented by one or more modules of the search engine 12. The search engine also determines the viewees (e.g., member profiles that satisfy a search query submitted by the searcher). The search engine also identifies member profiles corresponding to first-degree connections of the viewees (e.g., F_Degree_1-ist_viewee). For each of the member profile corresponding to first-degree connections of the viewees, the search engine also determines whether the member profile includes a work history that specifies a company that is the same as a company specified in a work history of a colleague of the searcher. Based on a determination that a work history in a member profile of a viewee specifies a same company as a company specified in a work history of a first degree connection of the viewee, the search engine also determines whether there is a work overlap between the viewee and the first-degree connection of the viewee. In various embodiments, this bottom-up approach reduces the problem set. For example, instead of first-degree connections of colleagues of the searcher being analyzed, the first-degree connections of the viewees are analysed.

Figure 7:
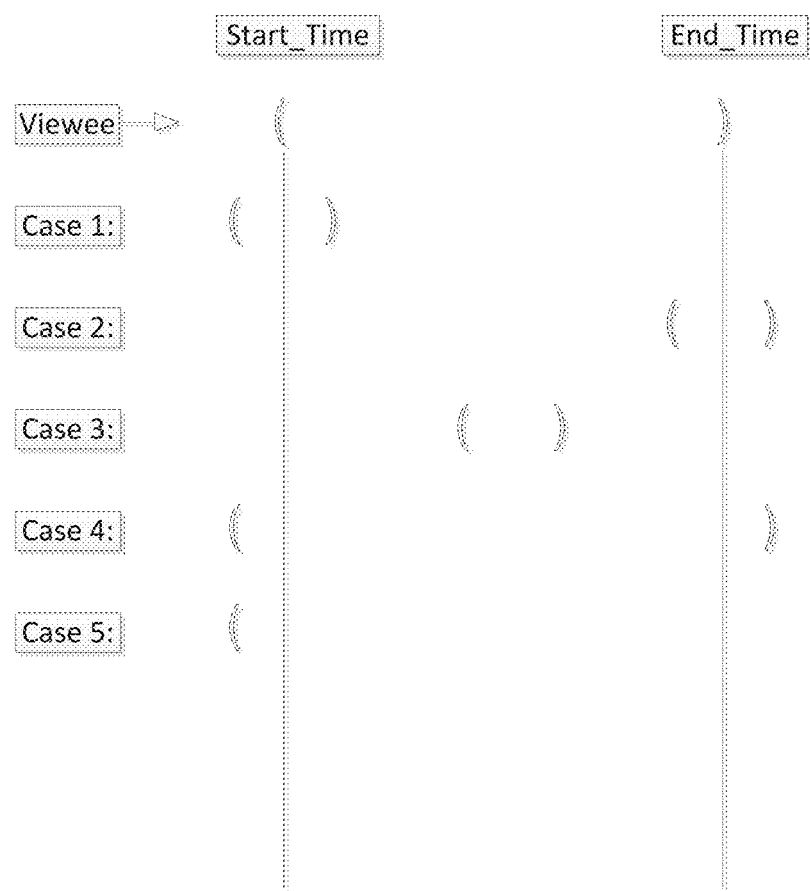
FIG. 7 is a diagram depicting a method of determining that there is a work overlap between an employment of a first member at a company and an employment of a second member at the company.

FIG. 7 is a diagram depicting a method 700 of determining that there is a work overlap between an employment of a first member at a company and an employment of a second member at the company. In various embodiments, the method 700 is implemented by one or more modules of the search engine 12. In various embodiments, the work histories specified in the member profiles of members of the social networking service are stored in a search index corresponding to each period of employment of the members, the search index comprising fields identifying an employer, a start date of employment by the employer of the member, and an end date of employment by the employer of the member. The search engine also determines a date at which the first member (e.g., the viewee) started employment at the company and a date at which the first member ended employment at the company. The search engine also determines that there is a work overlap between the first member and the second member at the company based on a determination that: (1) the date at which the second member started employment at the company came before the date at which the first member started employment at the company and the date at which the second member ended employment at the company came before the date at which the first member ended employment at the company, (2) the date at which the second member started employment at the company came before the date at which the first member started employment at the company and the date at which the second member ended employment at the company came after the date at which the first member ended employment at the company, (3) the date at which the second member started employment at the company came after the date at which the first member started employment at the company and the date at which the second member ended employment at the company came before the date at which the first member ended employment at the company, (4) the date at which the second member started employment at the company came before the date at which the first member started employment at the company and the date at which the first member ended employment at the company came after the date at which the first member ended employment at the company, or (5) the date at which the second member started employment at the company came before the date at which the first member started employment at the company and the second member has not ended employment at the company (or the date at which the second member ended employment at the company is undetermined).

Figure 8:
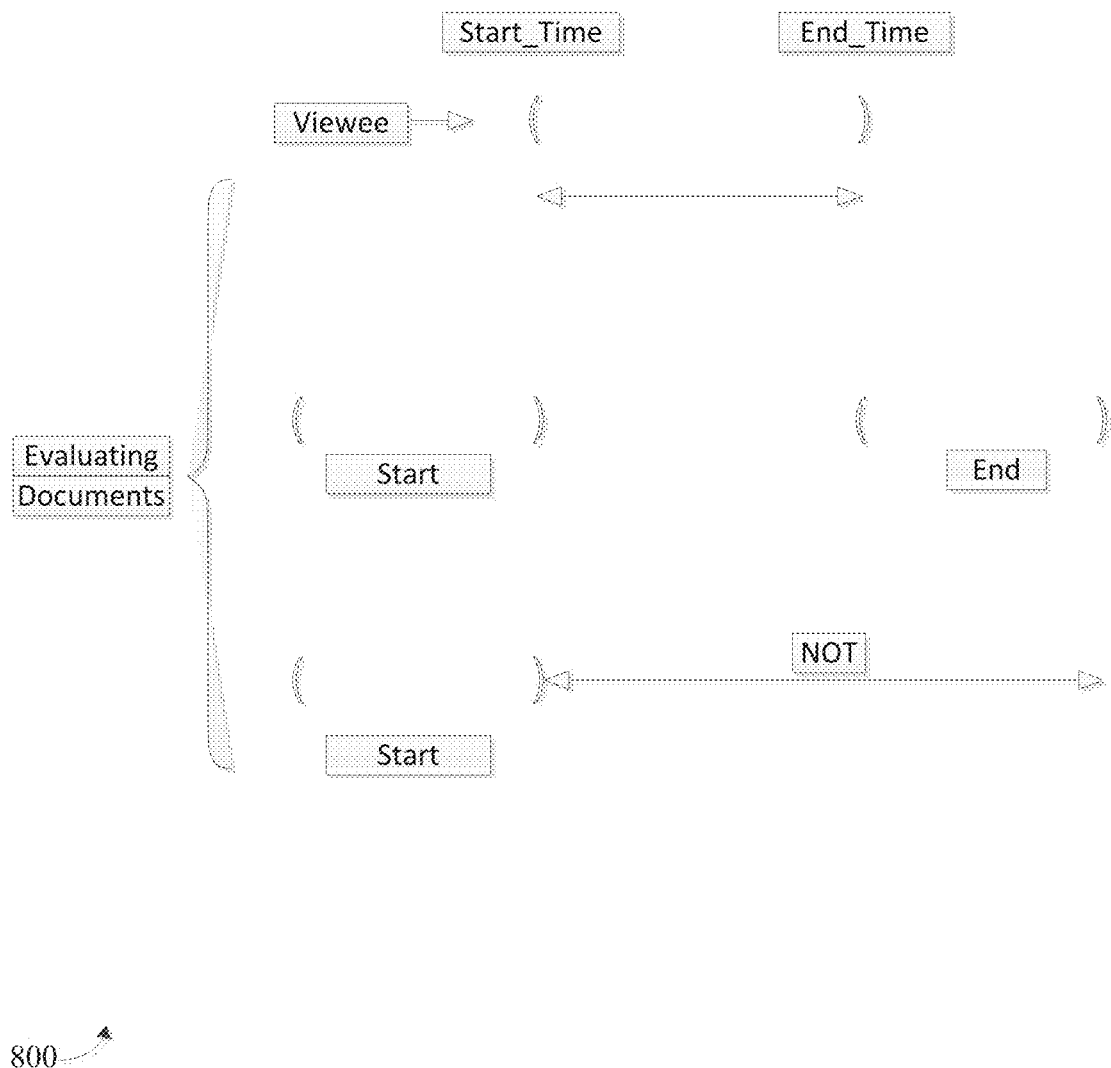
FIG. 8 is a diagram depicting a method of determining that there is not a work overlap between an employment of a first member at a company and an employment of a second member at the company.

FIG. 8 is a diagram depicting a method 800 of determining that there is not a work overlap between an employment of a first member at a company and an employment of a second member at the company. In various embodiments, the method 800 is implemented by one or more modules of the search engine 12. The search engine determines a date at which the first member (e.g., the viewee) started employment at the company and a date at which the first member ended employment at the company. The search engine then determines that there is not an overlap between the first member and the second member at the company based on a determination that (1) the start date of the employment of the second member did not come before the start date of the employment of the first member or the end date of the employment of the second member did not come after the end date of the employment of the first member and (2) the start date of the employment of the second member did not come after the start date of the employment of the first member or before the end date of the employment of the second member.

Figure 9:
FIG. 9 is a user interface diagram illustrating an example of how search results may be presented by a search engine, consistent with some embodiments of the invention.

FIG. 9 is a user interface diagram illustrating an example of how search results may be presented by a search engine (e.g., search engine 12), consistent with some embodiments of the invention. In the example user interface of FIG. 9, a member of a social network service has performed a search with the search query, "John Smith". The results of processing the search query are shown in the example web page 900, with six different member profiles satisfying the search query. For purposes of this example, presume that the searching member resides in San Jose, Calif., and is currently employed at "Games R Great." The member profile presented in the search results with reference number 54 appears at the top of the search results list, because it has been assigned the highest ranking score, in part because the member associated with the member profile is a direct or first degree connection, of the searching member. The second search result in the list, with the second highest assigned ranking score, is the member who both lives in San Jose—the same city in which the searching member resides—and is employed at the company "Games R Great"—the same company at which the searching member is employed. In this example, the ranking score assigned to the member profile with reference number 56 was given a boost as a result of similarities in specific member profile attributes shared in common with the member initiating the search. In various embodiments, an effect based on work overlap may also be reflected in the search results. For example, a search result may be boosted based on a determination that it corresponds to a member profile representing a co-worker of the searcher who is a first-degree connection of a viewee and also has a work overlap with the viewee. Thus, an identification of a work overlap may boost a particular search result in the rankings based on, for example, the strength of the work overlap, as discussed above.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 10:
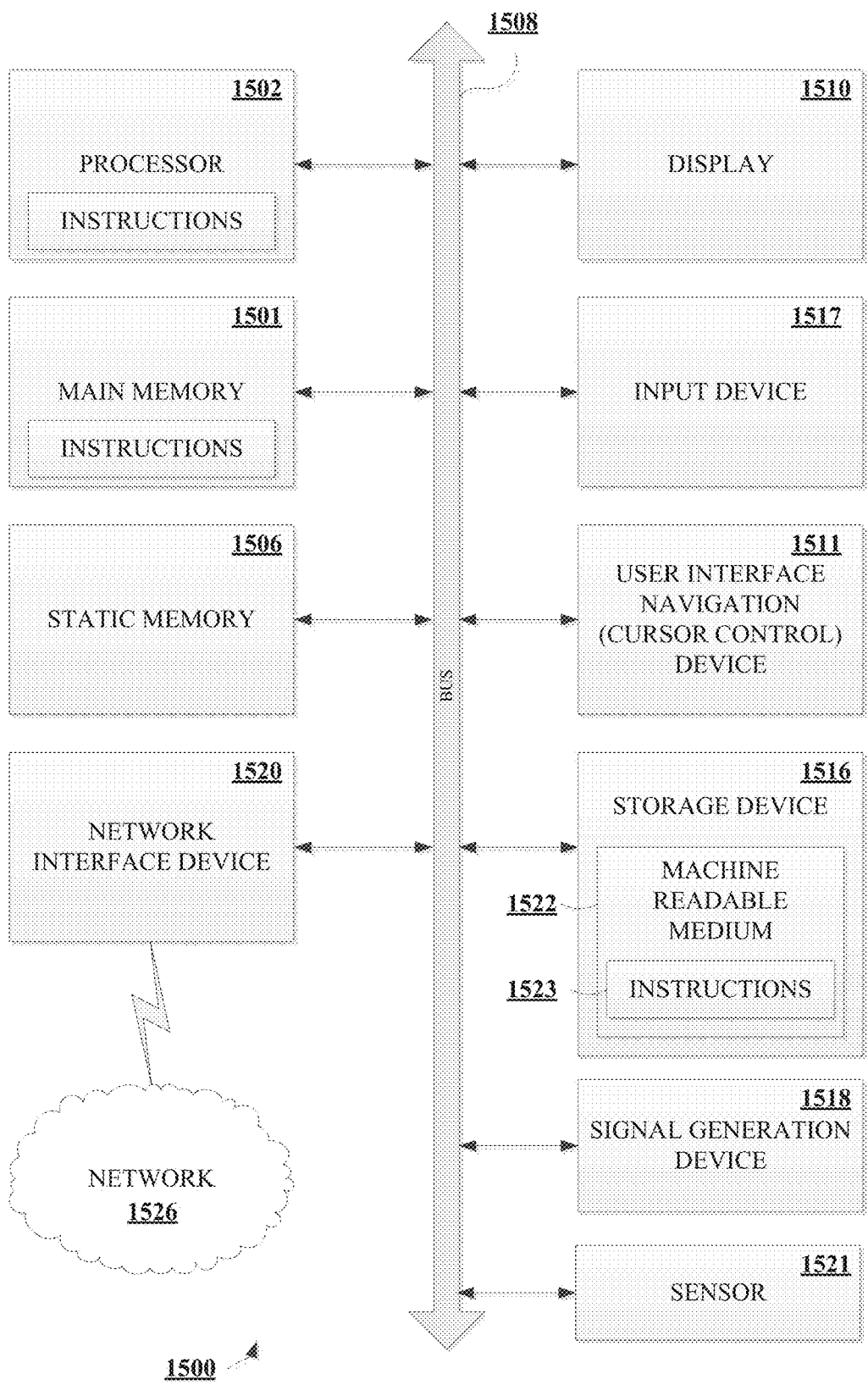
FIG. 10 is a block diagram of a machine in the form of a computing device within which a set of instructions, for causing the machine to perform any one or more of the methodologies discussed herein, may be executed.

FIG. 10 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
incorporating a set of instructions into one or more memories of a social networking service, the set of instructions configuring one or more computer processors of the social networking service to perform operations for improving a search results user interface of the social networking service by determining rankings of search results presented in the search results user interface based on work histories, the operations comprising:
processing a search query initiated by a searcher to identify a set of member profiles satisfying the search query, the set of member profiles corresponding to a set of members of the social networking service;
assigning a ranking score to each member profile of the set of member profiles based on a ranking criterion;
identifying a subset of the set of member profiles based on a determination of an overlap between a work history specified in each of the subset of member profiles and a work history specified in a profile of the searcher, the overlap pertaining to dates of employment at a particular employer included in the work history specified in each of the subset of member profiles and included in the work history specified in the profile of the searcher, the identifying of the subset of the set of member profiles further based on a determination of an overlap between a work history specified in each of the subset of member profiles and a work history specified in a profile of the searcher;
determining the ranking score assigned to a member profile of the subset of the set of member profiles based on the overlap; and
communicating, for presentation as search results in a search results interface, a portion of each of the set of member profiles satisfying the search query, the search results positioned to reflect the ranking score assigned to each of the member profiles of the set of member profiles.

2. The method of claim 1, wherein the determination of the overlap includes a determination that each of the subset of the set of member profiles corresponds to a subset of the set of members who are current colleagues of the searcher and the method further comprises:
identifying an additional set of member profiles based on a determination of an overlap between a work history specified in each of the subset of member profiles and a work history specified in the additional set of member profiles; and
communicating a portion of the additional set of member profiles for presentation in the search results user interface.

3. The method of claim 2, wherein the identifying of the additional set of member profiles is further based on a determination that the additional set of member profiles corresponds to an additional set of members of the social networking system who are first-degree connections of the colleagues of the searcher.

4. The method of claim 2, wherein none of the additional set of member profiles satisfies the search query.

5. The method of claim 1, wherein the amount of the adjusting of the ranking score is further based on a recency of the overlap.

6. The method of claim 1, wherein the identifying of the subset includes using a bottom-up approach to reduce the problem set for scalability for real-time computation.

7. The method of claim 1, further comprising communicating a visual indicator for presentation with the search results, the visual indicator to be used to identify each of the subset of the member profiles in the search results.

8. A system comprising:
one or more computer processors;
one or more computer memories;
a set of instructions incorporated into the one or more computer memories, the set of instructions configuring the one or more computer processors to perform operations for improving a search results user interface of the social networking service by determining rankings of search results presented in the search results user interface based on work histories, the operations comprising:
processing a search query initiated by a searcher to identify a set of member profiles satisfying the search query, the set of member profiles corresponding to a set of members of a social networking service;
assigning a ranking score to each member profile of the set of member profiles based on a ranking criterion;
identifying a subset of the set of member profiles based on a determination of an overlap between a work history specified in each of the subset of member profiles and a work history specified in a profile of the searcher, the overlap pertaining to dates of employment at a particular employer included in the work history specified in each of the subset of member profiles and included in the work history specified in the profile of the searcher, the identifying of the subset of the set of member profiles further based on a determination of an overlap between a work history specified in each of the subset of member profiles and a work history specified in a profile of the searcher;
determining the ranking score assigned to a member profile of the subset of the set of member profiles based on the determination; and
communicating, for presentation as search results in a search results interface, a portion of each of the set of member profiles satisfying the search query, the search results positioned to reflect the ranking score assigned to each of the member profiles of the set of member profiles.

9. The system of claim 8, wherein the determination of the overlap includes a determination that each of the subset of the set of member profiles corresponds to a subset of the set of members who are current colleagues of the searcher and the set of instructions further configure the one or more processors to:
identify an additional set of member profiles based on a determination of an overlap between a work history specified in each of the subset of member profiles and a work history specified in the additional set of member profiles, and
communicate a portion of the additional set of member profiles for presentation in the search results user interface.

10. The system of claim 9, wherein the identifying of the additional set of member profiles is further based on a determination that the additional set of member profiles corresponds to an additional set of members of the social networking system who are first-degree connections of the colleagues of the searcher.

11. The system of claim 9, wherein none of the additional set of member profiles satisfies the search query.

12. The system of claim 8, wherein the amount of the adjusting of the ranking score is further based on a recency of the overlap.

13. The system of claim 8, wherein the identifying of the subset includes using a bottom-up approach to reduce the problem set for scalability for real-time computation.

14. The system of claim 8, the operations further comprising communicating a visual indicator for presentation with the search results, the visual indicator to be used to identify each of the subset of the member profiles in the search results.

15. A non-transitory computer-readable storage medium storing instructions thereon, which, when executed by one or more processors, cause one or more processors to perform operations for improving a search results user interface of the social networking service by determining rankings of search results presented in the search results user interface based on work histories, the operations comprising:
   processing a search query initiated by a searcher to identify a set of member profiles satisfying the search query, the set of member profiles corresponding to a set of members of a social networking service;
   assigning a ranking score to each member profile of the set of member profiles based on a ranking criterion;
   identifying a subset of the set of member profiles based on a determination of an overlap between a work history specified in each of the subset of member profiles and a work history specified in a profile of the searcher, the overlap pertaining to dates of employment at a particular employer included in the work history specified in each of the subset of member profiles and included in the work history specified in the profile of the searcher, the identifying of the subset of the set of member profiles further based on a determination of an overlap between a work history specified in each of the subset of member profiles and a work history specified in a profile of a connection of the searcher;
   adjusting the ranking score assigned to a member profile of the subset of the set of member profiles based on the determination; and
   communicating, for presentation as search results in a search results interface, a portion of each of the set of member profiles satisfying the search query, the search results positioned to reflect the ranking score assigned to each of the member profiles of the set of member profiles.

16. The non-transitory computer-readable storage medium of claim 15, wherein the determination of the overlap includes a determination that each of the subset of the set of member profiles corresponds to a subset of the set of members who are current colleagues of the searcher and the operations further comprise:
   identifying an additional set of member profiles based on a determination of an overlap between a work history specified in each of the subset of member profiles and a work history specified in the additional set of member profiles; and
   communicating a portion of the additional set of member profiles for presentation in the search results user interface.

17. The non-transitory computer-readable storage medium of claim 16, wherein the identifying of the additional set of member profiles is further based on a determination that the additional set of member profiles corresponds to an additional set of members of the social networking system who are first-degree connections of the colleagues of the searcher.

18. The non-transitory computer-readable storage medium of claim 16, wherein none of the additional set of member profiles satisfies the search query.

19. The non-transitory computer-readable storage medium of claim 15, wherein the amount of the adjusting of the ranking score is based on a recency of the overlap.

20. The non-transitory computer-readable storage medium of claim 15, wherein the identifying of the subset includes using a bottom-up approach to reduce the problem set for scalability for real-time computation.

* * * * *

UNITED STATES PATENT AND TRADEMARK OFFICE
CERTIFICATE OF CORRECTION

| | |
|---|---|
| PATENT NO. | : 10,831,846 B2 |
| APPLICATION NO. | : 16/056202 |
| DATED | : November 10, 2020 |
| INVENTOR(S) | : Rahul Agarwal |

Page 1 of 1

It is certified that error appears in the above-identified patent and that said Letters Patent is hereby corrected as shown below:

In Column 18, Line 58, in Claim 9, delete "profiles," and insert --profiles;-- therefor Signed and Sealed this
Nineteenth Day of January, 2021

Andrei Iancu
*Director of the United States Patent and Trademark Office*